United States Patent [19]
Allison

[11] 3,869,015
[45] Mar. 4, 1975

[54] MOTOR VEHICLE SUSPENSION
[75] Inventor: William D. Allison, Grosse Pointe Farms, Mich.
[73] Assignee: Ford Motor Company, Dearborn, Mich.
[22] Filed: Dec. 3, 1973
[21] Appl. No.: 421,473

[52] U.S. Cl. ............................. 180/71, 280/124 R
[51] Int. Cl. .............................................. B60g 9/02
[58] Field of Search ... 180/71, 73 D, 73 TL, 73 TT; 280/124 R

[56] References Cited
UNITED STATES PATENTS
2,669,315  2/1954  Butterfield ............................ 180/71
3,444,947  5/1969  Stocks ................................. 180/71

Primary Examiner—Philip Goodman
Attorney, Agent, or Firm—Clifford L. Sadler; Keith L. Zerschling

[57] ABSTRACT

According to the present disclosure, a rear suspension system for a motor vehicle includes a pair of lower suspension arms and a single upper arm that is offset from the center line of the vehicle. A diagonally arranged link interconnects the vehicle frame and the upper suspension arm. Rubber connectors are interposed where the ends of the link are coupled to the frame and the upper arm. The rubber connectors at the ends of the suspension link provide a non-linear deflection rate for lateral movement of the axle with respect to the frame whereby ride and handling of the vehicle is improved.

13 Claims, 6 Drawing Figures

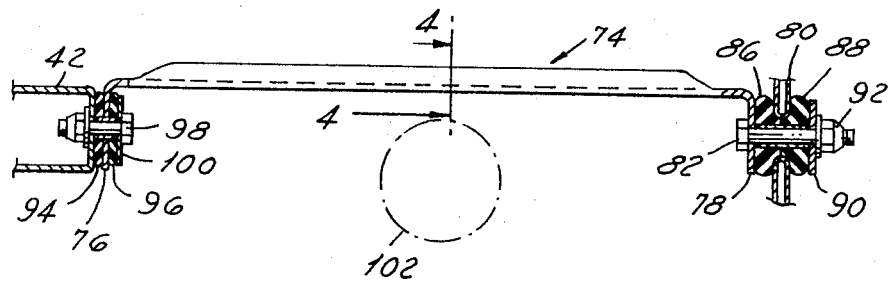
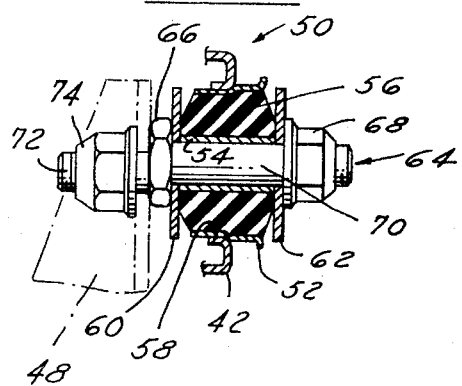
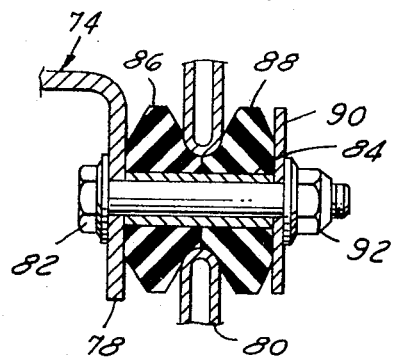

MOTOR VEHICLE SUSPENSION

BACKGROUND AND SUMMARY OF THE DISCLOSURE

In known prior art rear suspensions for motor vehicles having a pair of lower suspension arms and a single upper arm, a Panhard rod interconnects a point on the axle and a pivot on the frame. The Panhard rod controls lateral movement of the vehicle body with respect to the axle. According to the present invention, an improved suspension is provided that eliminates the Panhard rod. A unique upper suspension arm and link construction is provided for controlling lateral body movement whereby improved ride and handling characteristics result.

In the illustrated embodiment of the present invention, a rear suspension system for a motor vehicle includes a pair of lower suspension arms. The lower arms are connected to the vehicle frame and to the axle housing by means of resilient bushings. A single upper suspension arm is offset from the center line of the vehicle. The upper arm is also connected to the frame and to the axle housing by resilient pivots. A diagonally arranged suspension link has its forward end connected to the frame by a resilient pivot that is aligned with the axis of the connection between the upper arm and the frame. The rearward end of the link is connected to the upper arm by a resilient connector.

The diagonal suspension link and its resilient connections with the frame and the upper arm control lateral movement of the vehicle body with respect to the axle housing. These resilient connectors are constructed to provide a non-linear deflection rate for lateral movement.

A vehicle suspension system according to the present invention is characterized by its improved performance. Unlike some prior art suspension systems having Panhard rods, a suspension according to the present invention permits vertical parallel translation of the axle without lateral displacement of the body relative to the axle. It provides a resilient lateral attachment between the body and axle with a non-linear deflection rate and selected maximum travel limitations. The lateral compliance rate is independent of the rear axle windup rate.

BRIEF DESCRIPTION OF THE DRAWINGS

Many objects and advantages of a motor vehicle suspension constructed in accordance with this invention will become apparent upon consideration of the following detailed description and the accompanying drawings, in which:

FIG. 3 is an elevational view of the suspension link of the suspension of FIG. 1;

FIG. 4 is a sectional view taken along section line 4—4 of FIG. 3 of the suspension link;

FIG. 5 is a sectional view taken along section line 5—5 of FIG. 1 of the resilient bushing connecting one end of the upper suspension arm to the axle housing; and FIG. 6 is a sectional view taken along section line 6—6 of FIG. 1 of the resilient bushing at one end of the suspension link.

DETAILED DESCRIPTION OF THE PREFERRED EMBODIMENT

Figure 1:
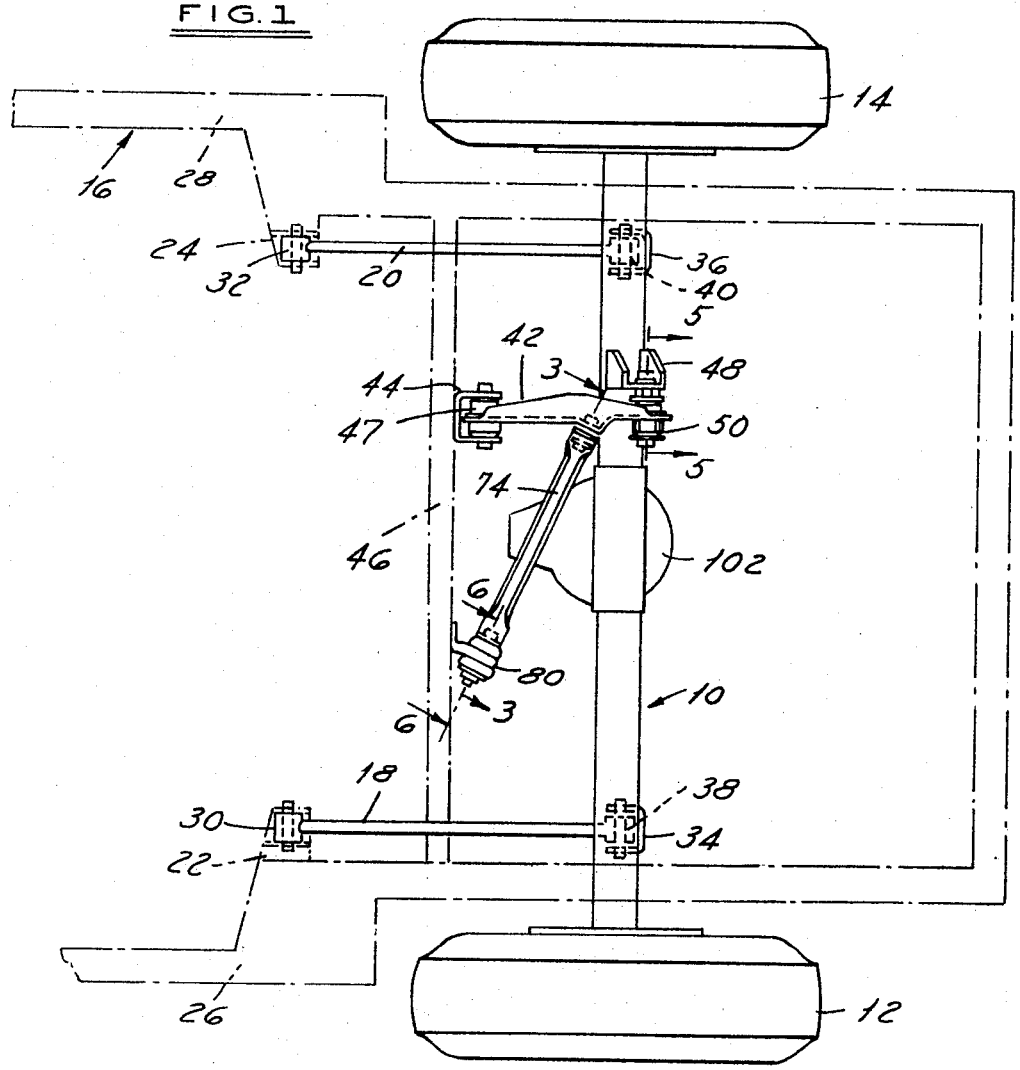
FIG. 1 is a top plan view of a unique rear suspension system for a motor vehicle.

FIG. 1 illustrates a rear suspension system for a motor vehicle that is constructed in accordance with this invention. A rear axle housing 10 rotatably supports left and right driving wheels 12 and 14. A vehicle frame assembly 16 is positioned over the axle housing 10 and is connected thereto by a unique suspension system. The frame components that comprise the frame assembly 16 may be separate from the vehicle body or may be formed integral with body sheet metal as in the case of a vehicle having unitized body construction.

The suspension system includes left and right lower suspension arms 18 and 20. The forward ends of the lower arms 18 and 20 are pivotally connected to brackets 22 and 24 which are welded to the left and right side rails 26 and 28 of the frame assembly 16. Resilient pivot bushings 30 and 32 connect the forward ends of the arms 18 and 20 to the frame brackets 22 and 24.

Figure 2:
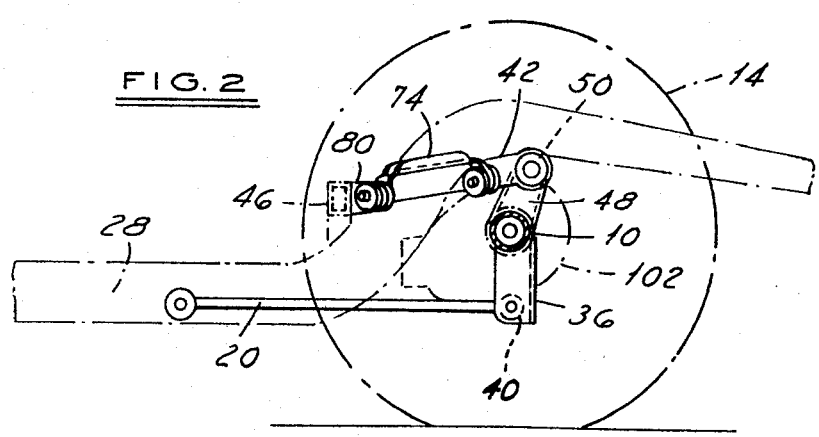
FIG. 2 is a side elevational view, partly in section, of the suspension system of FIG. 1.

Left and right attachment brackets 34 and 36 are welded to the axle housing 10 and extend downwardly therefrom as seen in FIG. 2. The rearward ends of suspension arms 18 and 20 are connected to the axle housing brackets 34 and 36 by means of resilient pivot bushings 38 and 40.

An upper suspension arm 42 is operatively interposed between the frame assembly 16 and the axle housing 10. A bracket 44 is welded to a frame cross member 46 and the upper suspension arm 42 is connected to the frame bracket 44 by means of a resilient bushing 47. An upstanding bracket 48 is welded to the axle housing 10. The rearward end of the upper arm 42 is pivotally secured to the bracket 48 by means of a resilient pivot bushing 50. It will be observed in FIG. 1 that at the suspension arm 42 is located laterally to one side of the center of the axle housing 10.

The construction of the pivotal connection between the arm 42 and the bracket 48 is illustrated in greater detail in FIG. 5. The resilient bushing includes an outer annular member 52, an inner cylinder 54 and an annular rubber element 56 that is interposed between the cylinder 54 and outer member 52. The rubber element 56 is bonded to the inner and outer members 54 and 52.

The rearward end of the suspension arm 42 has an aperture 58 in which the outer shell 52 of the bushing 50 is secured by means of a press fit.

The bushing assembly 50 is connected to the axle bracket 48 by a crank shape pivot bolt 64. The bolt 64 has eccentrically related shank portions 70 and 72. Portion 70 is secured to the bracket 48 and shank portion 72 supports the bushing 50.

A pair of washers 60 and 62 are positioned at the ends of the inner cylinder 54 of the bushing assembly 50 and on the shank portion 70 of pivot bolt 64. An inboard nut 66 adjacent the inboard washer 60 and an outer nut 68 engaging the outer washer 62 are threaded on the shank 70.

The shank portion 72 of bolt 64 passes through an aperture in the axle housing bracket 48 and is secured thereto by means of a nut 74.

The supporting bolt 64 has a crank shape in order to permit adjustment of the location of the pivot axis of the bushing 50 with respect to the axle housing bracket 48. The shank portion 70 may be angularly displaced relative to the shank 72 for adjustment purposes.

The construction of the bushing 47 connecting the forward end of the arm 42 to the frame bracket 44 is generally similar to the construction of the bushing 50. The resilient bushings connecting the suspension arms 18 and 20 to the frame and axle housing brackets are also similarly constructed. The attachment between the rearward end of the upper arm 42 and the axle bracket 48 is the only one, however, that employs a crank shape adjustment bolt.

In accordance with the present invention, means are provided to control the lateral position of the frame assembly 16 with respect to the axle housing 10. A diagonally arranged suspension link 74 is operatively interposed between the frame 16 and the upper suspension arm 42. The suspension link 74 includes a U-shape construction (see FIG. 4) for the major portion of its length and down-turned ends 76 and 78 that are each arranged at a 90 degree angle to the longitudinal axis of the link 74.

The link 74 is attached to a bracket 80 welded to frame cross member 46 by a resilient attachment construction as shown in FIG. 6. An attachment bolt 82 extends through an aperture in the end 78 of the link 74 and supports a metal tube 84. The bolt 82 and tube 84 extend through an aperture in the frame bracket 80. A pair of rubber grommets 86 and 88 are situated on either side of the bracket 80 and encircle the tube 84. The rubber grommets 86 and 88 are each of double conical construction. Grommet 86 is interposed between the link end 78 and the bracket 80. Grommet 88 is interposed between the bracket 80 and a washer 90. A nut 92 threaded on the end of the bolt 82 preloads the rubber elements 86, 88 in compression and secures the end of the link 74 to the bracket 80.

The resilient attachment construction of FIG. 6 provides a pivotal connection between the link 74 and the frame member 46 that is aligned with the pivot axis of the bushing 47 connecting the upper arm 42 to the frame member 46. The resiliency of the grommets 86 and 88 permits the link 74 to be displaced in a direction parallel to the axis of the bolt 82. The double conical construction of the grommets 86, 88 provides a non-linear deflection rate for the displacement of the link 74.

The suspension link 74 is connected to the suspension arm 42 by a resilient connection that includes rubber grommets 94 and 96 that are situated on either side of the down-turned end 76 of the link 74. An attachment bolt 98 passes through the center of the grommets 94, 96 and holes in the link end 76 and suspension arm 42. The bolt 98, in cooperation with a washer 100, secures the suspension link 74 to the upper suspension arm 42.

The axle housing 10 includes a centrally situated differential housing 102. As seen in FIG. 3, the construction of the link 74 with the down-turned ends 76, 78 permits the suspension link to pass over the nose of the differential housing 102 and avoid interference therewith.

The suspension of FIG. 1 includes a pair of suspension springs and a pair of telescopic shock absorbers. These suspension components are not illustrated in order to simplify the drawing. The suspension springs may be coil springs that are concentrically situated with respect to the telescopic shock absorbers to form a resilient strut. Such struts may be interposed between the axle housing and the vehicle body or they may be interposed between the suspension arms 18, 20 and the body.

OPERATION

During normal jounce and rebound movement of the axle housing 10 with respect to the frame 16, the suspension arms 18, 20 and 42 will pivot about their various attachment bushings in a reasonably conventional fashion. At the same time, the link 74 will pivot about its attachment to the bracket 80. Due to the longitudinal orientation of the upper and lower suspension arms, vertical jounce and rebound movement will not produce lateral forces in the suspension.

The resilient attachment of FIG. 6 permits limited lateral displacement or compliance between the vehicle frame 16 and the axle housing 10. Due to the double conical construction of the grommets 86 and 88, a non-linear deflection rate is provided for the lateral movement of the vehicle body with respect to the axle. Such movement may be induced during body roll or by a side load on the vehicle such as a centrifugal force. It has been discovered that a suspension system which provides limited lateral displacement of the body with respect to the axle housing has improved ride and handling characteristics. Where the lateral displacement is at a non-linear rate, the performance of the suspension is even further enhanced.

The foregoing description presents the presently preferred embodiment of this invention. Modifications and alterations may occur to those skilled in the art that will come within the scope and spirit of the following claims.

I claim:

1. A suspension system for a motor vehicle having a pair of driving wheels, a rigid axle housing rotatably supporting said wheels and a vehicle frame structure, said suspension system including a pair of axle positioning members operatively connected to said axle housing and said frame structure, a suspension system including a pair of axle positioning members operatively connected to said axle housing and said frame structure, a suspension arm interposed between said frame structure and said axle housing, first pivot means connecting said suspension arm to said frame structure and second pivot means connecting said arm to said axle housing, said first pivot means having a generally transverse pivot axis, a suspension link, a first connector means connecting one end of said suspension link to said frame structure, said first connector means being disposed on the pivot axis of said first pivot means, second connector means connecting the other end of said suspension link to said suspension arm, one of said connector means being constructed to permit limited displacement of said suspension link in a direction parallel to its longitudinal axis relative to one of said frame structure and suspension arm.

2. A suspension system for a motor vehicle according to claim 1 and including:

said one connector means including a resilient element operatively interposed between said suspension link and said one of said frame structure and suspension arm.

3. A suspension system for a motor vehicle according to claim 2 and including:
said resilient element having a non-linear deflection rate.

4. A suspension system for a motor vehicle having a pair of driving wheels, a rigid axle housing rotatably supporting said wheels and a vehicle frame,
a pair of lower suspension arms,
pivot means connecting the ends of said lower suspension arms to said frame and to said axle housing,
an upper suspension arm interposed between said frame and said axle housing,
fore and aft bushings pivotally connecting said upper suspension arm to said frame and to said axle housing,
said fore bushing being vertically spaced apart from pivot means,
a diagonally arranged suspension link operatively interposed between said upper suspension arm and said frame,
means connecting said suspension link to said upper suspension arm at a location intermediate the ends of said upper suspension arm,
said upper suspension arm being laterally offset from the center of said axle housing.

5. A suspension system for a motor vehicle according to claim 4 and including:
said suspension system having only one upper suspension arm.

6. A suspension system for a motor vehicle having a pair of driving wheels, a rigid axle housing rotatably supporting said wheels and a vehicle frame,
a pair of lower suspension arms,
resilient pivot means connecting the ends of said arms to said frame and to said axle housing,
an upper suspension arm interposed between said frame and said axle housing,
fore and aft resilient bushings pivotally connecting said upper arm to said frame and to said axle housing,
a diagonally arranged suspension link operatively interposed between said upper suspension arm and said frame,
a first resilient device pivotally connecting one end of said link to said frame and a second resilient device connecting the other end of said link to said upper suspension arm,
said resilient devices providing a nonlinear deflection rate for the lateral displacement of said body with respect to said axle housing when said body is subjected to a lateral force.

7. A suspension system for a motor vehicle according to claim 6 and including:
said upper suspension arm being laterally offset from the center of said axle housing.

8. A suspension system for a motor vehicle according to claim 7 and including:
said suspension system having only one upper suspension arm.

9. A suspension system for a motor vehicle having a pair of driving wheels, a rigid axle housing rotatably supporting said wheels and a vehicle frame,
a pair of lower suspension arms,
resilient pivot means connecting the ends of said arms to said frame and to said axle housing,
a single upper suspension arm interposed between said frame and said axle housing,
said upper suspension arm being laterally offset from the center of said axle housing,
fore and aft resilient bushings pivotally connecting said upper arm to said frame and to said axle housing,
a diagonally arranged suspension link operatively interposed between said upper suspension arm and said frame,
a first resilient device including a pair of double conical grommets pivotally connecting one end of said link to said frame,
a second resilient device connecting the other end of said link to said suspension arm,
said rubber grommets providing a non-linear deflection rate for the lateral displacement of said body with respect to said axle housing when said body is subjected to a lateral force.

10. A suspension system for a motor vehicle according to claim 9 and including:
said suspension link having an elongated body portion of generally U-shape in cross section,
said ends of said suspension link comprising portions perpendicularly arranged with respect to the body of said link.

11. A suspension system for a motor vehicle having a pair of driving wheels, a rigid axle housing rotatably supporting said wheels and a vehicle frame structure,
suspension means interconnecting said axle housing and said frame structure,
said suspension means being constructed to accommodate vertical jounce and rebound movement of said axle housing with respect to said frame structure,
said suspension means including a suspension arm,
first and second pivot means pivotally connecting first and second ends of said arm to said frame structure and to said axle housing, respectively,
a diagonally arranged suspension link,
first attachment means connecting a first end of said suspension link to said frame structure,
second attachment means connecting a second end of said suspension link to said suspension arm at a location intermediate said first and second ends of said suspension arm,
at least one of said attachment means being constructed to permit lateral displacement of said frame structure relative to said axle housing.

12. A suspension system for a motor vehicle according to claim 11 and including:
said second attachment means including a resilient element operatively interposed between said link and said suspension arm.

13. A suspension system for a motor vehicle according to claim 11 and including:
said first attachment means including a first resilient connector operatively interposed between said first end of said suspension link and said frame structure and said second attachment means including a second resilient connector operatively interposed between said second end of said suspension link and said suspension arm.

* * * * *